United States Patent [19]

Wieder

[11] Patent Number: 4,620,068

[45] Date of Patent: Oct. 28, 1986

[54] COMMUNICATION HEADSET

[75] Inventor: Klaus Wieder, Helenville, Wis.

[73] Assignee: Remic Corporation, Elkhart, Ind.

[21] Appl. No.: 617,694

[22] Filed: Jun. 6, 1984

[51] Int. Cl.⁴ .......................... H04M 1/05; H04R 1/10

[52] U.S. Cl. ............................ 179/156 A; 179/156 R; 179/182 R; 181/129

[58] Field of Search ............... 179/156 A, 156 R, 178, 179/179, 182 R, 182 A; 455/89; 181/129; 381/87, 88

[56] References Cited

U.S. PATENT DOCUMENTS

| | | | |
|---|---|---|---|
| 1,747,778 | 2/1930 | Küchenmeister | 179/156 R |
| 3,190,973 | 6/1965 | Aileo | 179/156 R |
| 4,166,978 | 9/1979 | White et al. | 455/82 |
| 4,529,057 | 7/1985 | Telford | 179/156 R |

FOREIGN PATENT DOCUMENTS

| | | | |
|---|---|---|---|
| 3407237 | 10/1984 | Fed. Rep. of Germany | 179/156 R |
| 1303612 | 1/1973 | United Kingdom | 179/156 R |

OTHER PUBLICATIONS

Telephony, Aug. 30, 1982, p. 95.

*Primary Examiner*—Gene Z. Rubinson
*Assistant Examiner*—Danita R. Byrd
*Attorney, Agent, or Firm*—Leo J. Aubel; Ralph R. Rath; Robert E. Wagner

[57] ABSTRACT

An earphone for a wireless communication system having a transceiver unit for converting electrical signals to audio signals and coupling the audio signals through the earphone includes a shallow cup that has a communication passage between the exterior and interior with a closure member biased to a first position for sealing the communication passage and having a switch manipulatable to move the closure member from the position position to provide voice communication through the communication passage.

8 Claims, 4 Drawing Figures

COMMUNICATION HEADSET

DESCRIPTION

Technical Field

The present invention relates generally to communication systems and, more particularly, to a communication system of the type incorporated into headsets worn by users while performing various other functions.

BACKGROUND OF THE INVENTION

The use of portable communication systems has been in existence for decades and the most basic version of such communication system consists of a two-way radio having a receiving circuit and a transmitting circuit incorporated therein. The basic type of two-way radio has been and continues to be used extensively by police forces, firefighters, construction workers, and various other environments. Such basic two-way radio communication systems usually consist of a unit which may be attached to an article of clothing and which is adapted to automatically receive any signals transmitted thereto, amplify the signals and condition the signals to be heard without detaching the unit from the article of clothing.

Generally speaking, these basic types of unit incorporate a manually-operable switch that is capable of converting the unit from a receiver unit to a transmitter unit which is usually designed such that the switch must be manually held in position during transmission of the signal. While such units have received a remarkable degree of acceptance in various fields and are capable of being mass produced at an extremely low cost, certain inherent deficiencies make such units unacceptable in numerous environments.

For example, two-way communication systems are absolutely essential around airports where ground personnel must communicate with aircraft operators for various reasons, such as communication between the ground crew and the pilot while the pilot is taxiing along the runway towards a gate. In such type of environment and many others, it is impossible for the ground crew to be able to utilize the simplified version of two-way radio because of the surrounding noise level. Furthermore, in such environment for safety and health reasons, it is mandatory that the ground crew have headsets on at all times to protect the ears from any sudden dangerous noise level which could result in permanent damage to the ear.

Thus, more recently, two-way communication systems have been developed that are incorporated into headsets or other protective gear, such as helmets, that are worn by various types of personnel, such as aircraft ground crews, construction workers, factory workers, and others. The basic type of two-way communication system incorporated into headsets or other protective devices originally incorporated communicaton and receving units that again had to be manually switched between the "transmit" mode and the "receive" mode by the user. Such operation is not only time consuming and annoying to the user, but could become a safety hazard in the unlikely event that the user neglects to place his equipment in the "receive" mode, and it becomes essential that a transmission be received.

Extensive strides have been made in recent years towards perfection of the two-way communication system wherein the switching between the "transmit" and the "receive" mode is voice-controlled. Such a system, particularly when incorporated into headsets or other type of protective devices, leaves the user free to perform other chores with his hands while communicating through the system. Examples of such types of voice-controlled, two-way communication systems are disclosed in U.S. Pat. No. 4,166,978, incorporated herein by reference, and the various U.S. patents cited therein. Such system as the one disclosed in the above patent, assigned to the Assignee of the present invention, has received a remarkable degree of commercial acceptance since the voice-controlled system incorporates rapid-response switching systems that quickly convert the system between the "transmit" and the "receive" modes whenever there is any interruption in the speech from the transmittor.

While remarkable strides have been made to substantially completely isolate the user of such communication systems from any external sounds, regardless of the noise level in the operating environment, it many times becomes necessary for the user to be able to hear sounds from a fellow worker in close proximity. While numerous systems have been developed, the extremely sensitive systems which are totally soundproof to the wearer from external noises still requires the user to manually separate the headset from the ear a sufficient distance to allow sounds or voices from a fellow worker in close proximity thereto to be heard. Such a procedure is not only cumbersome for the user, but can also cause injury to the ear in the unlikely event that an extremely loud sound rapidly emanates from a source while the user has the headset at least partially removed from the ear, which may cause permanent damage to the ear.

Thus, there remains a need for a simplified type of two-way communication system which normally isolates the wearer from any surrounding sounds that are not transmitted through the communication system itself, but still allows the wearer to easily convert the communication system to a condition where an adjacent worker's voice can easily be heard.

SUMMARY OF THE INVENTION

According to the present invention, a two-way communication system has been developed that is incorporated into a headset which has earphones having the communication system directly incorporated therein and preferably voice-controlled so that the operator can communicate with a second headset through speech alone, leaving the hands free at all times for performing other functions simultaneously.

The two-way communication system of the present invention is in the form of a headset having a transmitting circuit, a receiving circuit, and a microphone associated therewith which incorporates a novel, manually-operable mechanism that can easily be manipulated by the wearer to be capable of hearing external sounds, such as the voice of a fellow worker in close proximity thereto, without the need of removing or even separating the headset from the sound-sealing condition around the ear.

More specifically, the headset constructed in accordance with the present invention incorporates a pair of hollow cups that are adapted to be placed in sound-sealing engagement with the head of the user around the ears to isolate the ears from all external sounds other than the sounds transmitted through the headset through normal use. The respective earphones or hollow cups incorporate a communicating passage or port between the outer and inner surfaces thereof which are normally closed by a sealing means located inside of the cup and held in a first position with a sealing means having an element extending through the cup which can be manually manipulated to open the communication pasage whenever desired so that surrounding voices can be heard without distrubing the sealing condition of the headset around the ears of the user.

In its specific embodiment illustrated, the sealing means is in the form of a closure member or plate that has a sound-deadening surface adapted to be placed into sealing engagement around the communication passage inside the hollow cup with an integral button extending from the plate through the hollow cup and exposed outside of the cup for manual manipulation. Preferably, the element is in the form of a small projection or button that has a particularly-configured free end outside of the hollow cup and a locking ledge between the free end and the adjacent plate. Preferably, the closure member or sealing plate is spring-biased to a first sealing position and is manually movable by the projection from such sealing position to a second position opening the communicating passage with the locking ledge on the projection being engageable with a corresponding shoulder on the headset, more particularly the wall of the hollow cup.

In the best mode illustrated in the drawings, subsequently to be described, the sealing means is in the form of a generally rectangular plate that has a pair of apertures which are telescoped over a pair of posts fixedly secured and extending from the inner surface of the hollow cup with a pair of springs telescoped over the posts or pins to bias the sealing plate to the first sealing position.

The external communicating system can easily be incorporated into the present commercial designs of the headset-type communicating systems with minimum modifications thereof at a nominal cost.

BRIEF DESCRIPTION OF SEVERAL VIEWS OF DRAWINGS

DETAILED DESCRIPTION

Figure 1:
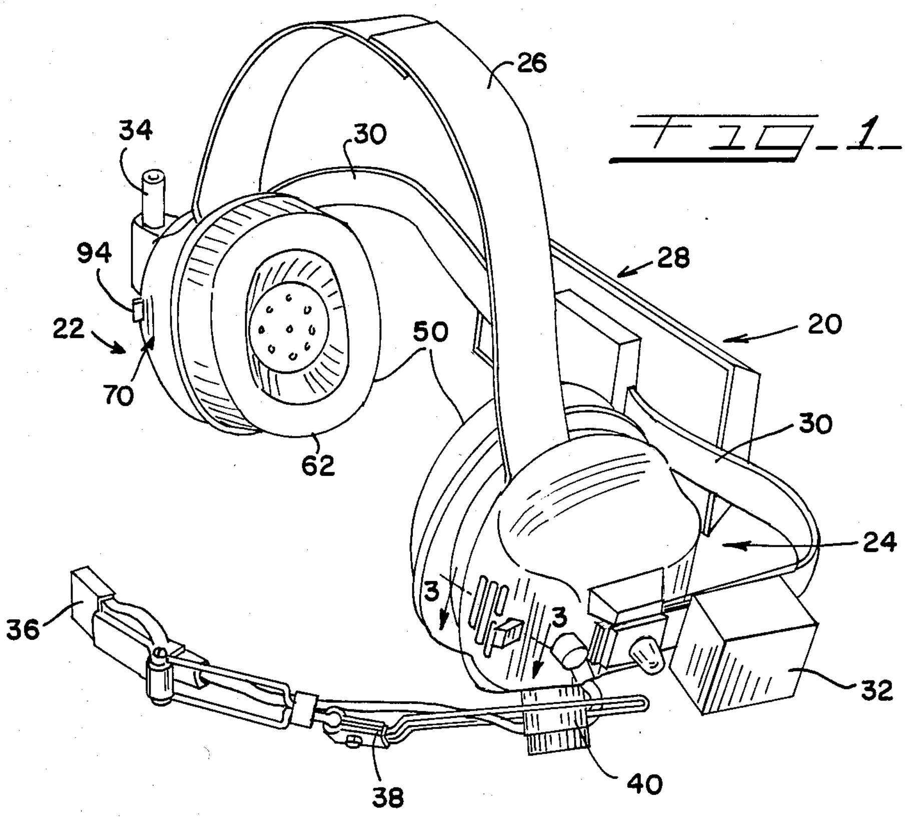
FIG. 1 is a perspective view of a two-way communication headset having the present invention incorporated therein.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

FIG. 1 of the drawings discloses a communication system generally designated by reference numeral 20 having the features of the present invention incorporated therein. The communication system 20 is preferably one that is commercially available from the Assignee of the present invention and sold as a U'nicom ® two-way FM radio communication system. The system includes a headset that can be worn with or without various other types of head gear, such as helmets and other safety units, and consists of a pair of earphones 22 and 24 that are substantially identical in construction and are interconnected by an adjustable crown strap 26. The earphones 22 and 24 are each connected to a transceiver unit 28 which includes a transmitting circuit and a receiving circuit and is connected to the respective earphones 22 and 24 through communication straps 30. The transeiver unit may be constructed in accordance with the teachings of the above patent and incorporates a power source 32, such as a battery, and also includes an antenna 34 which may be connected to the respective earphones 22 and 24. The communication system described above also incorporates a microphone 36 that is supported on a support assembly 38 that is connected at 40 to one of the earphones or earpieces. The earpiece 24 having the microphone 36 supported thereon may also incorporate a manual ON/OFF switch for operating the microphone, as well as a squelch control switch (not shown).

The system so far described is designed as a wireless communication system which is capable of converting electrical signals transmitted between two headsets to audio signals and is voice-controlled so that the user can transmit and receive communications while performing other manual tasks with the hands.

The commercially-available units incorporate a substantial amount of sound-deadening materials, particularly inside and around the respective earphones 22 and 24 so that the user wearing the earphones is substantially completely isolated from any noise in the surrounding environment. While this arrangement is extremely beneficial in providing a very effective communication system which is completely isolated except from the corresponding remote unit, there are certain times that such complete isolation is undesirable in that it may be necessary for a user wearing the headset to communication directly with a fellow worker directly adjacent thereto. With most of the communication headsets which are being marketed, any communication with fellow workers in the immediate area requires the wearer of the headset to manually separate the earphone from the ear to allow voice communication to be heard from the fellow worker. As indicated above, such arrangement is very unsatisfactory and is also hazardous in that it may cause permanent damage to the ear in the event that the earphone is partially separated so that a fellow worker's voice can be heard and a very harsh sound is rapidly generated in close proximity thereto.

According to the present invention, a unique simplified system has been developed for modification of conventional commerically-available headsets so that the user can easily manipulate the headset to be able to hear a fellow worker's voice without separating the headset from sealing engagment around the ears of the wearer.

Figure 2:
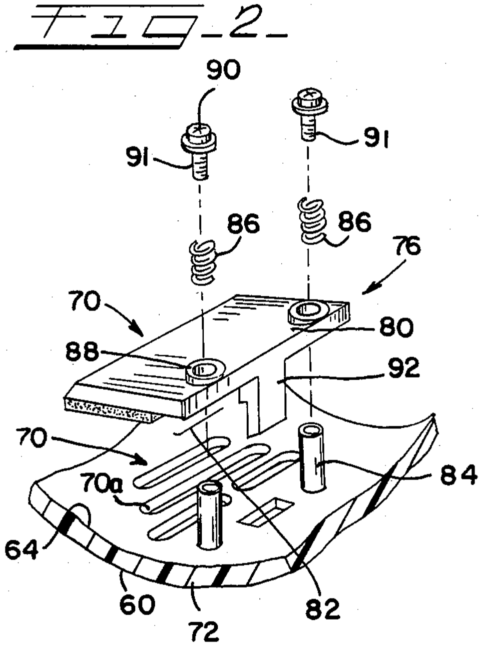
FIG. 2 is a fragmentary, exploded view of the earphones showing the details of the present invention.
Figure 3:
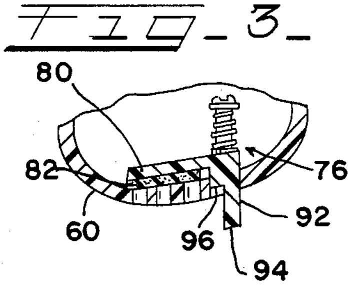
FIG. 3 is a fragmentary, cross-sectional view as viewed generally along line 3—3 of FIG. 1 showing further details of construction; and, FIG. 4 is a view similar to FIG. 3 showing the elements in a second position.
Figure 4:
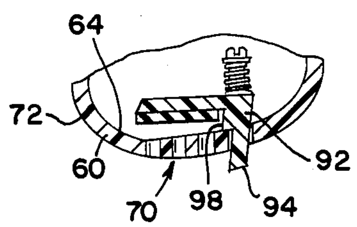

More specifically, as illustrated in FIGS. 2–4, each earphone 22 or 24 consists of a shallow hollow cup 60 that carries sound-deadening material 62 (FIG. 1) around the perimeter thereof, as well as along an interior surface 64. The sound-deadening material or sealing means is designed to provide a sealing engagement with the skin around the ear so that only sounds eminating through the headset are heard by the wearer.

According to the present invention, the hollow cup 60 has a communicating passage or port means 70 extending from the interior surface 64 to the exterior surface 72 to provide voice communication from the atmosphere to the interior of the hollow shallow cup 60. The earphone also incorporates sealing means 76 inside the hollow cup 60 which is normally held in a first position for sealing the communication passage 70 along the inner surface 64. The sealing means 76 is in the form of a closure member or plate 80 that has a sound-deadening surface 82 exposed to the interior surface 64 of the shallow cup 60.

The closure member or plate 80 is supported inside the hollow cup 60 through support means consisting of a pair of spaced posts 84 extending from the inner surface 64 of the cup 60 with the closure member or plate 80 telescoped over the posts 84 by threaded screws 91. The posts or support means 84 slideably support the closure member 80 and have coil springs 86 telescoped thereon with one end of the coil springs 80 engaging the ends of hollow sleeves 88 extending from plate 80 and the opposite end engaging enlarged portions 90 defined on the free ends of the posts 84. Thus, the biasing means 86 normally bias the closure member or plate 80 to a first position wherein the acoustical interior 82 provides a complete seal for the communication passage or port means 70, as illustrated in FIG. 3.

The closure member 80 is movable from the first position to open the port means or communication passage 70 and provide voice communication from the surrounding atmosphere to the interior of the hollow cup 60. For this purpose, the closure member has a switch means 92 preferably intergral therewith with the switch means being in the form of a button or projection that extends through the hollow cup 60 and has a free end 94 exposed on the outside of the cup for manual manipulation. The projection or button 92 is preferably integral with the adjacent surface of the closure member 80 and has a latch means in the form of a locking ledge or surface 96 intermediate opposite ends which cooperates with a corresponding ledge 98 that is defined in the opening in the hollow cup 60.

With the unit so far described, during normal use of the headset 20, the telescoping coil springs 86 bias the closure member or plate into engagement with the inner surface 64 of the hollow cups to seal the communication passage 70 so that only communications received through the transceiver 28 are heard by the person wearing the headset. If, however, communication is to be established with a fellow worker in close proximity thereto, the person wearing the headset need only reach up to one or both of the earphones 22 or 24 and press on the free end 94 of the button 92, which will force the closure member or plate 80 against the bias of springs 86 to move the closure member from the first sealing position to a second communicating position. The second communicating position is shown in FIG. 4 and defined by the cooperating ledges 96 and 98 so that the passage can remain open as long as desired. However, whenever the operator or user desires to close the passage, it is only necessary to manipulate the button 92 and separate the ledges 96 and 98, whereupon the biasing means 86 will move the closure 80 to the closed sealing position.

The communication passage 70 preferably includes a plurality of individual slots 70*a* rather than a single opening to provide better sound transmission and the padded interior surface 82 of closure 80 prevent resonence of the sounds within the hollow cup 60.

As can be appreciated from the above description, the present invention provides a simple modification of a rather complex communication system which allows the operator to completely isolate himself from the surrounding environment under normal conditions and yet allow voice communications with a fellow worker by mere manipulation of a button on the headset. Such communication can easily be established with existing headsets by only minor modifications of the invention.

Of course, various modifications come to mind without departing from the spirit of the invention. For example, the sealing means or closure member has been shown to be located inside the earphone or hollow, shallow cup, but it is readily apparent that the closure member could readily be outside the cup without departing from the spirit thereof. However, one disadvantage with having the closure member on the outside is that the closure member could possibly be inadvertently moved and open the passage inadvertently.

Furthermore, while a closure member in the form of a slideable plate that is spring biased by coil springs has been shown, the closure member could also be in the form of a single element formed of a plastic material which could have an integral biasing hinge incorporated therein utilizing the elastic memory of the plastic material so that one section of the hinge could be secured to the inner surface of the shallow cup 60 and the hinge could act as the support, as well as the biasing means, for the closure member or plate.

I claim:

1. An earphone for a wireless communication system, transducer means for said system for converting electrical signals to audio signals, means for coupling said audio signals through said earphone to the user's ear, said earphone comprising a cup adapted to surround the user's ear and having sealing means to substantially seal the user's ear from surrounding audio signals, port means extending through said cup and providing voice communication from the surrounding atmosphere, closure means including a plate inside said cup and having a first position normally sealing said port means with biasing means for moving said plate to said first position, and switch means secured to said plate and extending through said cup for moving said closure means from said first position to another position to allow a user to hear voice communication through said port means, whereby the user may activate said switch to open said port to vent the interior of said earphone housing to adjacent surroundings to more easily receive surrounding audio signals through said port means to the user's ear to enable a user to more easily receive communications from the immediate vicinity.

2. An earphone as defined in claim 1, in which said button has position defining means cooperating with said cup for defining a second position for said plate providing voice communication through said port means.

3. An earphone as defined in claim 1, in which said cup has an interior post with said plate telescoped on said post and said biasing means includes a spring telescoped over said post.

4. An earphone as defined in claim 3, in which said cup has a pair of spaced interior posts with said plate movable between first and second positions on said posts.

5. A wireless communication system including transducer means for converting electrical signals to audio signals, means for coupling said audio signals to a user's ear, and an earphone incorporating said coupling means, said earphone comprising a hollow cup adapted to surround the user's ear and having audio communication sealing means in surrounding engagement therewith, a communication passage extending between exterior and interior surfaces of said cup, a closure member inside said cup, support means including a pair of spaced posts with said closure member slideable on said posts, biasing means incuding a pair of springs telescoped over said posts and normally maintaining said closure member in a first position closing said communication passage, and actuator means connected to said closure member and extending through said cup to be accessible exteriorly of said cup for moving said closure member from said first position to another position allowing voice communication through said passage from a person adjacent said earphone.

6. A wireless communication system as defined in claim 5, in which said actuator means includes a button extending from said closure member and having a locking ledge cooperating with said cup to define a second position in which said passage remains open.

7. In a communication system including a headset having a pair of hollow cups adapted to enclose the ears of a user, a transceiver unit and a microphone operable so that signals received from an external source may be amplified and transmitted directly through the hollow cups to the ears of a user and signals can be generated through the microphone and transmitted through the transceiver to a remote transceiver unit, the improvement of each of said hollow cups each having a communication passage extending between an outer and an inner surface thereof for providing communication from adjacent surroundings into said cup, sealing means inside said hollow cup biased to a first position for sealing said passage along said inner surface, a manipulatable element extending from said sealing means through said cup between said inner and outer surfaces and exposed for access outside said cup and manually manipulatable by said user so that said sealing means may be manually moved from said first position to open said passage and allow voice communication through said passage into said hollow cup to the ear, said sealing means includes a closure member supported in said cup and movable from said first position to a second position and in which said manipulatable element extends from said closure member and has latch means cooperating with said cup to define said second position and said cup has support members slideably supporting said closure member and spring means on said support members biasing said closure member to said first position.

8. A communication system as defined in claim 7, in which said element includes a button integral with said closure member and having a locking ledge intermediate opposite ends defining said latch means.

* * * * *